S. GODDARD.
TIRE CHAIN CONNECTION.
APPLICATION FILED FEB. 10, 1920.

1,353,828.

Patented Sept. 28, 1920.

INVENTOR
S. Goddard.
BY J. Edward Maybee.
ATTY.

UNITED STATES PATENT OFFICE.

STEWART GODDARD, OF TORONTO, ONTARIO, CANADA.

TIRE-CHAIN CONNECTION.

1,353,828.   Specification of Letters Patent.   Patented Sept. 28, 1920.

Application filed February 10, 1920. Serial No. 357,759.

*To all whom it may concern:*

Be it known that I, STEWART GODDARD, of the city of Toronto, in the county of York, Province of Ontario, Canada, have invented certain new and useful Improvements in Tire-Chain Connections, of which the following is a specification.

This invention relates to means for securing in position the independent tire chains commonly employed with truck tires and more particularly to means for detachably securing to the wheel rim the chain connectors shown and described in my Patent 1,338,009, issued April 27th, 1920, and my object is to devise connecting means which will releasably hold the chain connectors in such a way as to prevent the possibility of accidental disengagement and so that the traction strains on the chains produce a minimum of bending effect on the connectors.

I attain my object by means of the constructions hereinafter described and illustrated in the accompanying drawings in which—

Figure 3:
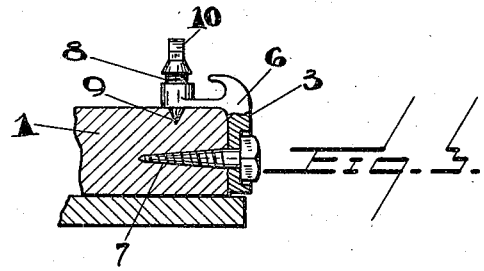
Figure 4:
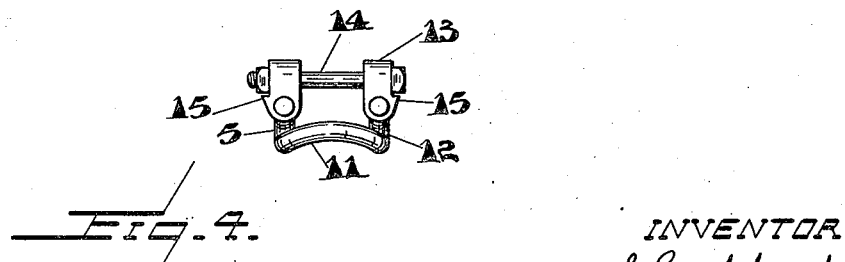

Fig. 3 a cross section of part of a wheel rim illustrating the method of connecting the hook to the rim; and Fig. 4 plan view of a front elevation of the chain connector.

In the drawings like numerals of reference indicate corresponding parts in the different figures.

Figures 1, 2:
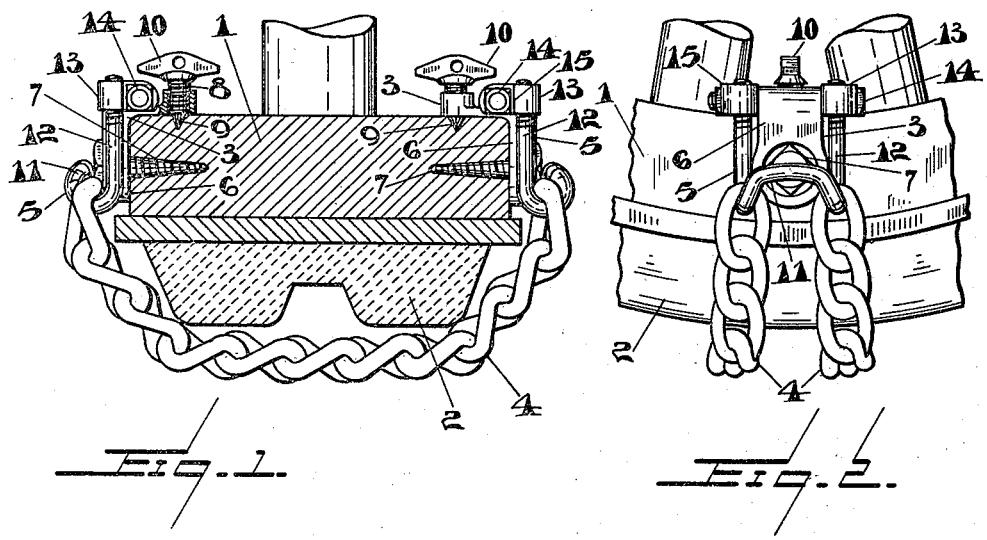
Figure 1 is a cross section showing a chain applied by means of my special connectors to a wheel provided with a double solid rubber tire.
Fig. 2 is a side elevation of the same.

1 is a wheel rim to which a rubber tire 2 is connected in the usual manner. 3. are hooks which are connected to the wooden rim or felly of the wheel as hereinafter described. A plurality of chains 4 are engaged with chain connectors 5, which are adapted to be engaged on the hooks 3. The hooks are provided with ears 6 fitting respectively against the side and inner periphery of the wooden rim. In the ear fitting against the side of the rim is formed a hole for the passage of a screw or bolt 7. I show (see particularly in Fig. 3) a wood screw provided with a square head and which is screwed into the wooden rim. In the ear which fits against the inner circumference of the rim I form a threaded hole into which is screwed a screw 8 having a point 9 adapted to imbed itself in the wooden rim when the screw is turned down. The screw is provided with a T-head 10, which may be turned as shown in Fig. 1 to close the opening in the hook 3, but which may be turned to a position to permit of the connector 5 being disengaged from the hook. Each connector is formed with substantially parallel threaded stems 12 connected and bent to form hooks 11, with which the ends of the chains 4 are engaged. Each stem 12 is threaded through a block 13, which blocks are provided with holes for the passage of a bolt 14, which may be engaged with one of the hooks 3 as shown.

This bolt is provided with a head and with a nut having flattened sides, while each block 13 is provided with a lip 15 adapted to engage a flattened side of a nut and bolt head respectively to prevent the bolt or nut from turning, which prevents the unscrewing of the nut from the bolt. It will be noted that the hook is so proportioned that its sides engage the inner sides of the blocks 13. Thus, when the parts are in the position shown in Fig. 2, it is impossible to remove the bolt. If, however, the bolt be unhooked from the hook, the stems 12 are easily sprung together sufficiently to clear the nut from the lip 15 with which it has been engaged, after which it is easily unscrewed from the bolt and the latter removed from the blocks.

The bolt is thus easily placed in position in the blocks, while after the bolt has been engaged in the hook, accidental unscrewing of the nut is absolutely prevented. Accidental disengagement of the bolt from the hook is prevented by the closing of the opening of the hook by the T-head 10 of the screw 8.

It will also be noted that the ear 6 through which the screw 7 passes is of such width that it substantially engages the stems 12 of the chain connectors. The stems are thus supported to resist traction strains on the chains 4 as close as possible to the points of connection of said chains with the connector. Bending of the stems 12 by traction strains is thus prevented.

From the construction described it is evident that the device may be very quickly attached once the hooks have been placed in position, it being merely necessary to hook the bolts 14 into the hooks 13 and then to turn the T-heads 10 to prevent any accidental disengagement of the bolts. If the chains are too loose, one or both chain connections may be disengaged, the bolts 14 removed as hereinbefore described, and the blocks 13 screwed down on the stems until a sufficient amount of slack is taken up, when the pins are replaced and the connectors locked into position once more. Any broken chain is readily replaced by removing the connectors, removing the bolts 14 therefrom, unscrewing the blocks and then hooking a new chain into position. The disconnected parts are then replaced and the connectors hooked into position once more.

What I claim as my invention is:—

1. A hook for tire chains provided with two ears one adapted to fit against the side of a wheel rim and the other against the inner surface of the rim, the first ear having a hole for a screw formed therein and the other being provided with a cone-pointed spike threaded through the lug adapted to be driven into the rim, a head being formed on the screw adapted when turned to a suitable position to close the opening of the hook.

2. A hook for tire chains provided with an ear adapted to fit against the side of a wheel rim and having a hole for a screw formed therein in combination with a tire chain connector having substantially parallel stems adapted to lie on each side of said lug in substantial engagement with its sides; and a cross bar adapted to lie in said hook.

3. A hook for tire chains provided with an ear adapted to fit against the side of a wheel rim and having a hole for a screw formed therein in combination with a tire chain connector having substantially parallel stems adapted to lie on each side of said lug in substantial engagement with its sides; blocks into which said stems are threaded, each block having a lip formed therein; and a bolt connecting said blocks and having a flat sided head and nut with which the aforesaid lips are adapted to engage, the said bolt being adapted to lie in said hook with the blocks in substantial engagement with opposite sides of the hook.

4. A hook for tire chains provided with an ear adapted to fit against the side of a wheel rim and having a hole for a screw formed therein in combination with a tire chain connector having stems adapted to lie on each side of said lug; blocks into which said stems are threaded, each block having a lip formed therein; and a bolt connecting said blocks and having a flat sided head and nut with which the aforesaid lips are adapted to engage, the said bolt being adapted to lie in said hook with the blocks in substantial engagement with opposite sides of the hook.

5. A hook for tire chains adapted to be secured to a wheel rim in combination with a tire chain connector having substantially parallel stems; blocks into which said stems are threaded, each block having a lip formed therein; and a bolt connecting said blocks and having a flat sided head and nut with which the aforesaid lips are adapted to engage, the said bolt being adapted to lie in said hook with the blocks in substantial engagement with opposite sides of the hook.

6. A device constructed as set forth in claim 6 provided also with a lug fitting against the inner surface of the wheel rim and a screw threaded through the lug provided with a head adapted when the screw is turned to a suitable position to close the opening of the hook.

7. A hook for tire chains adapted to be secured to a wheel rim with the opening of the hook inwardly directed in combination with a tire chain connector provided with a cross bar adapted to be engaged in the hook; a lug on the hook fitting against the inner surface of the wheel rim and a screw threaded through the lug provided with a head adapted when the screw is turned to a suitable position to screw down on the point of the hook to close the opening of the hook.

Signed at Toronto, Canada, this 14th day of January, 1920.

STEWART GODDARD.